United States Patent [19]

Takada

[11] 4,262,858

[45] Apr. 21, 1981

[54] INERTIA-RESPONSIVE ACTUATING DEVICE FOR VEHICLE SEAT BELT RETRACTORS

[76] Inventor: Juichiro Takada, 3-12-1, Shinmachi, Setagayaku, Tokyo, Japan

[21] Appl. No.: 107,131

[22] Filed: Dec. 26, 1979

[30] Foreign Application Priority Data

May 8, 1979 [JP] Japan .................................. 54-055309

[51] Int. Cl.³ ...................... A62B 35/02; B65H 75/48
[52] U.S. Cl. .............................................. 242/107.4 A
[58] Field of Search ................................ 242/107.4 R; 242/107.4 E; 280/803, 806, 807, 808; 297/478, 480; 188/135–139

[56] References Cited

U.S. PATENT DOCUMENTS

| | | | |
|---|---|---|---|
| 3,819,126 | 6/1974 | Stoffel | 242/107.4 A |
| 4,057,200 | 11/1977 | Ubukata et al. | 242/107.4 A |
| 4,176,809 | 12/1979 | Thomas et al. | 242/107.4 A |

*Primary Examiner*—John M. Jillions
*Attorney, Agent, or Firm*—Brumbaugh, Graves, Donohue & Raymond

[57] ABSTRACT

An inertia-responsive actuating device for emergency locking vehicle seat belt retractors comprises a ball which normally nests stably in an annular seat but which rolls out of the seat and pushes down on a detecting portion of a pivotable lever. A hole in the lever detecting portion defines a circular detecting edge which matches and engages a lower portion of the ball located above, but proximate to, the ball seat and substantially below the center of gravity of the ball.

5 Claims, 7 Drawing Figures

INERTIA-RESPONSIVE ACTUATING DEVICE FOR VEHICLE SEAT BELT RETRACTORS

FIELD OF THE INVENTION

The present invention relates to inertia-responsive actuating devices for emergency-locking vehicle seat belt retractors of the type in which the belt reel automatically locks against unwinding of the belt in response to relatively high acceleration of the vehicle, such as occurs in an abrupt stop or a collision.

BACKGROUND OF THE INVENTION

Most belt retractors currently being used in motor vehicle occupant safety restraint belt systems are of the so-called emergency-locking type in which the belt is automatically locked against withdrawal in the event of a collision or an abrupt stop but is otherwise free to be withdrawn from the retractor so that the occupant is able to lean forward. Some emergency-locking retractors have a mechanism that locks the belt reel against rotation in the unwinding direction in response to a sudden withdrawal of the belt, i.e. acceleration of the belt itself, which occurs when the occupant is thrown forward in a collision. Others have an inertia-responsive device for locking the belt reel when the vehicle is relatively abruptly accelerated—or, more accurately, when an inertia-responsive device associated with the retractor detects such acceleration of the vehicle. So-called double-safety retractors have a mechanism which responds to both rapid pull-out of the belt and acceleration of the vehicle. (Throughout this specification, the term acceleration is used in the broad sense of a change in velocity in any direction and includes what is sometimes, in every day parlance, referred to as deceleration.)

A large number of inertia-responsive actuating devices for use in emergency-locking retractors have been proposed. In general, the presently known inertia-responsive devices fall into three general types. First is the type which uses a pendulum to detect acceleration of the vehicle. Most of the pendulum-type inertia-responsive devices include a generally horizontal support arm affixed to the retractor frame and a pendulum having a cap-like head portion that is supported on the support arm, a stem hanging from the underside of the cap portion and extending down through a hole in the support arm and a mass at the lower end of the stem. When the retractor is accelerated in any direction, the pendulum tilts relative to the support arm, and the cap acts on some sort of a lever or other motion-transmitting element which in turn operates on a mechanism which ultimately locks the reel against rotation. Examples of retractors having pendulum-type inertia-responsive devices are found in U.S. Pat. Nos. 3,343,765, 3,930,622, 3,991,953 and 4,053,117, the last two of which are owned by the assignee of the present invention.

A second general type of inertia-responsive device comprises a support and a mass which rests on the support, normally in a stable upright position, tilts on the base in the event of acceleration of the base relative to the mass, and operates on a motion-transmitting device, such as a pawl which engages ratchet teeth on a ratchet wheel affixed to the belt reel. Two representative examples of this type of inertia-responsive device are found in U.S. Pat. Nos. 3,758,044 and 3,901,459.

The third type of inertia-responsive device in emergency-locking retractors relies upon rolling motion of a spherical mass on a support and a lever or some other output element which the mass moves and which actuates a locking mechanism associated with the belt reel. The following patents describe and illustrate inertia-responsive devices of this rolling mass category.

Proctor U.S. Pat. No. 3,237,729—the spherical mass rolls in a dish-shaped support and moves a lever located above it upwardly whenever the mass rolls out of the center of the support.

Fiala U.S. Pat. No. 3,741,494—the spherical mass rolls on a horizontal support and works against a downwardly concave cam portion of a lever such that when the mass rolls from a central position under the cam, the lever is lifted up.

Hayashi U.S. Pat. No. 3,770,224—a spherical mass retained in a box on a slidable arm rolls in a dish-shaped support, and a dish-like output cam on the slidable arm moves an actuating pin when the mass rolls from the center of the support.

Stoffel U.S. Pat. No. 3,819,126—a sphere rolls in a dish-like support and normally holds a pawl in a position out of engagement with a ratchet wheel; the pawl has a pin which extends into a hole on the support and on which the ball normally rests but which is disengaged to allow the pawl to pivot when the ball rolls out of the center of the support.

Other examples of rolling mass devices are described and shown in Levasseur U.S. Pat. No. 3,921,931 and Föhl U.S. Pat. No. 4,050,644.

Many of the known inertia-responsive devices are of relatively complicated construction and require a large number of components and intricate assembly procedures; they are often costly to make and not always reliable. Some of the devices require large movements of the inertial mass to obtain the desired motion for transmission to the locking mechanism and thus take up valuable space and increase the size of the retractor, an important disadvantage in view of the current popularity and, indeed, economic necessity of small motor vehicles. Some designs of these devices are functionally inadequate insofar as they are sensitive to friction between the inertial mass and the lever, pawl or other output device or between components of an actuating linkage upon which the mass acts.

SUMMARY OF THE INVENTION

There is provided, in accordance with the present invention, an inertia-responsive actuating device which is useful in belt retractors of many types, uses very few parts, all of which can be manufactured at low cost, is easy, and therefore inexpensive, to assemble and is highly reliable in operation. In particular, an inertia-responsive actuating device, according to the present invention, comprises a spherical mass which normally nests in an annular seat on a support. The seat is located substantially below the center of gravity of the mass so that upon acceleration of the support, the mass rolls upwardly and laterally out of the seat. A lever arm is pivoted about a substantially horizontal axis located adjacent the seat and includes a detecting portion which is normally situated above the seat and below the center of the mass but which is engaged and pushed down by the mass when it rolls out of the seat. The movement of the lever may be transmitted in various ways to the retractor locking mechanism.

In a preferred embodiment, the detecting portion of the lever arm includes an edge defining a hole and surrounding a lower portion of the mass above, but proximate to, the seat so that regardless of the direction in which the mass rolls up and out of the normal nested position in the seat, it pushes down on the lever arm. To ensure that the mass will push down on the lever arm in instances in which there is a substantial downward vertical component of acceleration which might cause the mass to be lifted up out of the seat without pushing down on the lever arm, it is preferable for the device to include a casing having a generally horizontal wall above the mass and located a distance from the seat just slightly greater than the diameter of the mass. Accordingly, when the mass is inertially lifted from the seat it is prevented from rising above the seat a sufficient distance to avoid pushing down on the lever arm.

Another preferred aspect of the invention is a casing surrounding the mass on all sides and limiting lateral motion of the mass to a distance in any direction such that the center of gravity of the mass always lies within an imaginary, substantially vertical cylindrical surface which includes the edge of the seat on which the mass is nested in the normal, stable position. This feature ensures that the mass will roll back into the seat in the absence of a vehicle acceleration which causes it to roll out of the seat.

The lever arm may be of various configurations, depending upon the mechanism which it actuates. For example, the lever arm may be an integral part of a pawl which includes a locking tip that engages a ratchet wheel of the locking mechanism of the retractor when actuated by the mass.

Among the advantages of the invention is the ability to manufacture it from only three basic parts, (1) a casing having the seat in the bottom wall (although the casing is, of course, manufactured in two parts to allow installation of the mass, (2) the spherical mass or ball (which may be a commonly available ball manufactured for use in ball bearings) and (3) a lever which, preferably, has intregal pivot pins received in holes in the casing (although a separate pivot pin can, of course, be used). The device is well suited for use in a variety of retractors including those in which the inertia-responsive actuating device directly operates on a locking pawl associated with a main ratchet wheel affixed to the belt reel and those in which an intermediate locking mechanism responds to movement of the lever by locking a secondary ratchet wheel which in turn engages a main locking pawl with a main ratchet wheel affixed to the belt wheel.

The device can be made of relatively small size, as compared with the presently known devices, particularly in view of the fact that the amount of motion of the ball required to produce the desired movement of the lever is very small. Friction plays only a very small part in the operation of the device and, in many retractor installations, is limited to friction at the pivots of the lever; the ball does not slide along any surface to transmit motion to the lever but instead rolls from the seat and pushes down on the lever. Accordingly, the device can be designed to provide locking action within a very close tolerance to a desired design acceleration (which can be highly sensitive, say, approximately 0.3g). In those cases in which the retractor has an intermediate locking mechanism, the casing and the lever can be made of plastic. When the retractor has a direct locking mechanism, more durable construction, particularly a strong pawl, is required. In all cases, the small size, low weight, small number of parts, high degree of sensitivity and reliability add up to a substantial improvement.

For a better understanding of the invention, reference may be made to the following description of an exemplary embodiment, taken in conjunction with the figures of the accompanying drawings.

DESCRIPTION OF THE DRAWINGS

FIG. 2d is an end cross-sectional view of the embodiment taken generally along the lines 2d—2d of FIG. 2a;

DESCRIPTION OF AN EXEMPLARY EMBODIMENT

Figure 1:
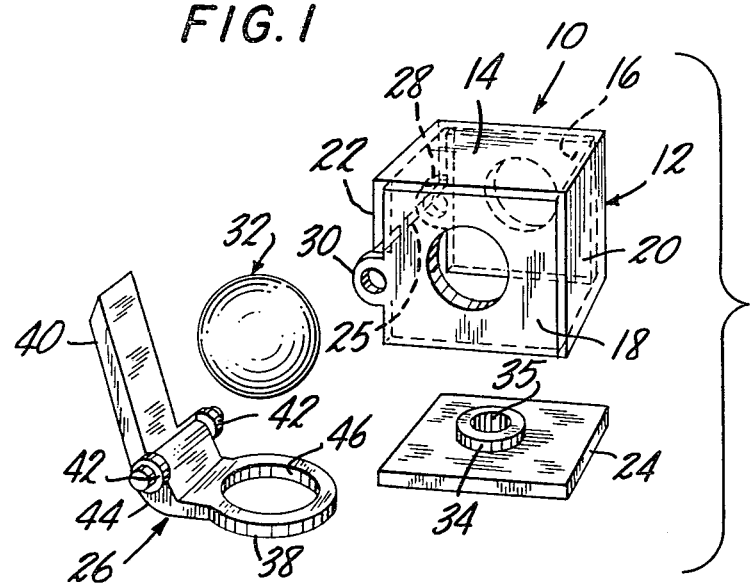
FIG. 1 is an exploded pictorial view of the embodiment.

The embodiment shown in the drawings comprises a casing 10 made in two parts, a box-like upper part 12 having a top wall 14, side walls 16 and 18 and end walls 20 and 22, and a bottom part 24. The end wall 22 extends only partway down from the top wall 14, thus leaving an opening 25 in the assembled casing 10 for reception of a lever arm 26. Small ears 28 and 30 with holes extend from the side walls adjacent the opening 25 and serve as pivot mountings for the lever 26. Upon assembly of the device, the ball and lever are installed in the upper casing and then the bottom 24 is fitted to the upper part 12 and joined by an adhesive, by thermal bonding, or by some suitable snap-on locking connection (not shown). The general configuration of the casing 10 illustrated in the drawings is merely exemplary of a variety of two-part constructions. One side wall can be formed with locating flanges or pins (not shown) to assist in installing the device on a retractor frame.

The bottom 24 of the casing constitutes a support for a spherical inertial mass (i.e., a ball) 32. The ball 32 normally nests in an annular seat 34 defined by an annular flange extending up from the wall 24. The seat 34 is preferably circular and may be the inner edge of a flange having a flat end (as shown) but can also be a bevelled surface generally matching the mass at the region of support. For savings in material and weight, the seat surrounds a circular hole 35 in the casing bottom 24. The center of gravity of the ball 32 is also the geometric center of the ball, and the ball nests in the seat 34 with its center of gravity coincident with the axis of the circular edge which defines the seat. The seat is located a substantial distance below the center of gravity of the mass, but a small segment of the ball extends below the plane of the seat. Thus, the mass 32 is normally stably supported within the seat 34 in the absence of an acceleration of the seat (in any direction) of sufficient magnitude to generate an inertial force on the ball 32 which will lift it up out of the seat and cause it to roll in a direction opposed to the direction of acceleration of the seat. It is well within the skill of those in the art to design the device so that the ball rolls up and out of the seat in response to some predetermined acceleration, such as approximately 0.3g. The design parameters include the mass and diameter of the ball 32, the diameter of the seat and the geometry, mass and center of gravity of the lever 26.

Figure 2A:
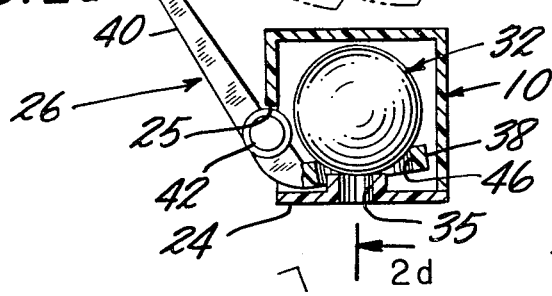
FIG. 2a is a side elevational view of the embodiment in which most of the casing and part of the pawl have been broken away in cross section for a clearer illustration.

The lever 26 comprises a detecting portion 38 which extends into the casing 10 through the opening 25 at the lower portion of the wall 22 and which is engaged and pivoted by the ball 32 when it rolls off the seat 34. In the illustrated embodiment the lever also acts as a pawl and, therefore, includes a locking tip portion 40 which is located outside of the casing and extends obliquely upwardly and outwardly away from the wall 22, so that it is movable between a position clear of a ratchet wheel R as shown in FIG. 2a and a position in which it engages and locks the ratchet wheel, FIGS. 2b and 2c. The lever has integrally formed pivot pins 42 which extend out from an enlarged portion 44 generally at the juncture between the detecting portion 38 and the locking tip portion 40. The respective pivot pins 42 are received in the holes in the ears 28 and 30 on the casing part 12. The casing 10 and the lever 26 are both manufactured of plastic and can be of a configuration which allows the lever 26 to be snap-fit to the casing ears by deformation of the walls of the casing sufficiently to allow the pivot pins 42 to be received in the holes. Each of the pivot pins has a shoulder portion which retains the lever 26 in position between the walls 16 and 18 of the casing.

The lever 26 is designed so that it normally rests in the release position shown in FIG. 2a by gravity, (and of course the inertia and the center of gravity of the lever 26 are taken into account in designing the system to respond to a predetermined acceleration). The detecting portion 38 of the lever 26 normally pivots up to an orientation slightly oblique to the bottom wall 24 of the casing (see FIG. 2a) and has a circular hole 46, the upper edge of which is a detecting edge and is of a diameter and a location relative to the pivot 42 such that it engages the ball 32 when the lever 26 is in the release position (the position shown in FIG. 2a), i.e. when the ball 32 is nested in the seat 34 and the locking tip 40 is clear of the ratchet wheel R. The detecting edge 46 is of necessity located a substantial distance below the center of the ball 32 and in the release position (FIG. 2a) lies somewhat above, though approximate to, the level of the seat 34 for the ball 32. When the ball 32 rolls up and out of the seat in any direction, it presses down on the detecting portion 38 and pivots the locking tip portion 40 into a position to engage a tooth of the ratchet wheel R.

Figures 2B, 2C:
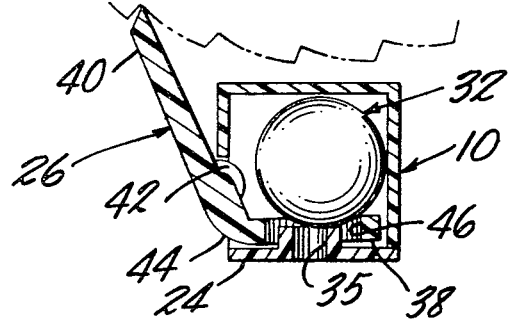
FIG. 2b is a medial side cross-sectional view of the embodiment illustrating one mode of operation.
FIG. 2c is a view similar to FIG. 2b but showing another mode of operation of the device.

For example, if the casing 12 is accelerated from right to left (with respect to the drawings) at a magnitude above the design acceleration (e.g., 0.3g), the inertia of the ball causes it to roll upwardly and to the right over a point at the right of the seat, as shown in FIG. 2b. In so doing, it pushes down on the right part of the detecting portion 38 and pivots the locking tip 40 into position for engagement by a tooth of the ratchet wheel R. Similarly, if the casing is accelerated from left to right, the inertia of the mass will cause it to roll slightly up and then to the left from the seat, as shown in FIG. 2c, thereby pushing down on the left part of the detecting portion 38 and with similar locking action of the locking tip 40 to a ratchet tooth. It should be readily apparent from a brief consideration of all of the FIGS. 2a through 2d that an acceleration of the casing in any direction of a magnitude above the design acceleration will cause the ball to roll from the seat, push down on the detecting portion and lock the ratchet wheel R against rotation in the direction in which the shoulders of the teeth face.

If the acceleration of the casing—acceleration of the casing, of course, reflects acceleration of the vehicle—were to have a substantial downward component it might be possible for the ball 32 to be lifted vertically up from the seat, and if it were possible for the ball to be lifted a substantial distance above the seat and above the detecting edge 46 of the lever, such motion would not produce the locking motion on the lever. Accordingly, it is highly preferable for the top wall 14 of the casing 10 to be located a distance above the seat 34 just slightly greater than the diameter of the ball. Accordingly, any tendency for the ball to lift upwardly under certain conditions of acceleration of the casing without producing the locking action is eliminated. Even if there were to be a substantial vertical component of acceleration, the ball is prevented from lifting up, and as long as it moves horizontally from the seat, it will produce the locking action by pressing down on the detecting portion 38 of the lever 26. Another highly preferred aspect of the device is the prevention of excessive motion of the ball such that it might attain a position in which it would not move back into the seat after the acceleration ceases. If that were to be permitted, it would be possible that in normal operation the ball would remain out of the seat and produce locking action when the vehicle is stopped and a passenger desires to enter or leave and to be released from, or fastened into, the restraint belt. Accordingly, the casing may be constructed to limit the motion of the ball so that the center of gravity of the ball always lies within an imaginary vertical cylindrical surface defined by the circular seat in which the ball rests within the normal range of inclination of the vehicle. It is desirable also to take into account the possibility that the vehicle is resting on an incline when it is stopped and the fact that re-seating of the ball can be assisted by reverse action of the lever when the emergency situation which caused the locking action ceases. When the belt reel rotates a few degrees in the winding direction, the ratchet of most locking mechanisms commonly used in emergency-locking retractors will rotate in the winding direction, in which event the tooth which engaged the locking tip 40 of the lever will move away from the locking tip 40 and the adjacent tooth will cam the lever in a direction to lift the detecting portion which, in turn, will lift the ball back into the seat. There can, accordingly, be variation in the amount of movement of the ball permitted by the casing as a matter of design. In any case, it may be desirable for the retractor to include a mechanism for totally deactivating the locking mechanism when the vehicle is stopped, particularly in the case of a passive seat belt system which responds to opening and closing motions of the door.

Each of the sidewalls 16 and 18 of the casing part 12 has a hole that is somewhat smaller than the size of the ball but which allows the ball to move laterally a slightly greater distance than if the wall did not have the hole. This allows the overall size of the casing to be reduced, saves the plastic material that would be present if the holes were not there, and quiets the impacts of the ball against the walls.

Figure 3:
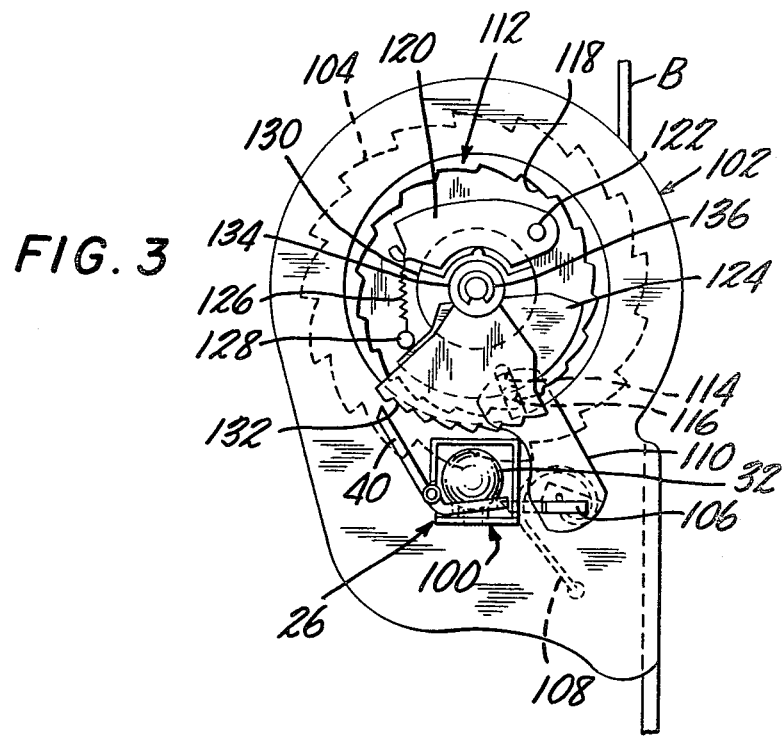
FIG. 3 is a side view of a retractor which employs the device of FIGS. 1 and 2 and shows the retractor in the unlocked condition—various parts are broken away for clearer illustration.
Figure 4:
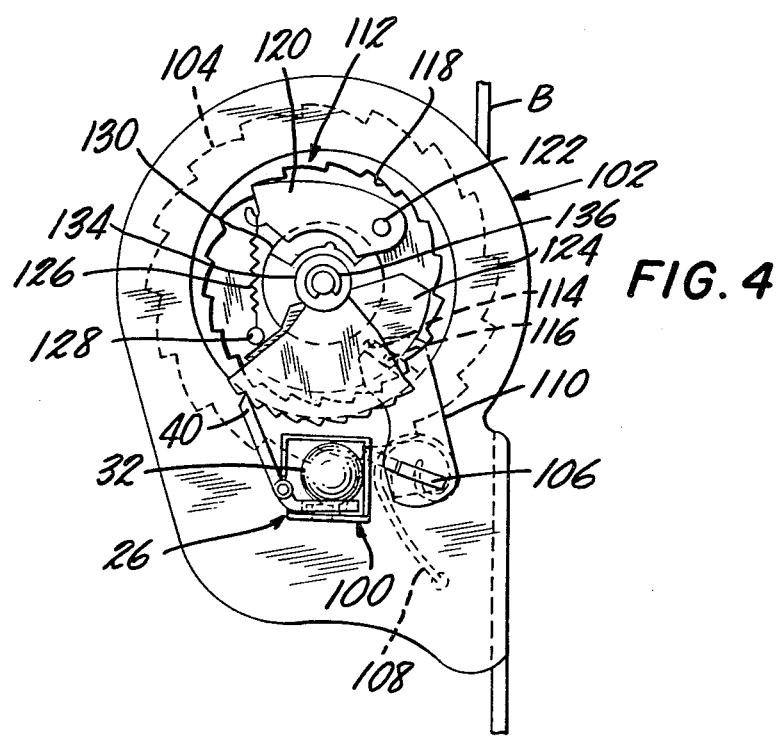
FIG. 4 is a view similar to FIG. 3, except that it shows the retractor in the locked condition.

FIGS. 3 and 4 illustrate an emergency-locking retractor into which an inertia-responsive actuating device, according to the present invention, is incorporated. Except for the actuating device 100, which is in all respects identical to the one shown in FIGS. 1 and 2a to 2d of the drawings, the retractor shown in FIGS. 3 and 4 is identical to the retractor described and shown in U.S. Pat. No. 3,991,953, issued Nov. 16, 1976 to Takata Kojyo Co. Ltd., the owner of the present invention and entitled, "Automatic Locking Safety Belt Retractor".

The retractor comprises a generally U-shaped frame 102 having side members in which a belt reel is rotatably mounted and onto which a belt B is wound by a winding spring (not shown). Ratchet wheels 104 are affixed to the ends of the reel spool and have ratchet teeth which face in the direction of rotation of the reel in the belt-unwinding direction. A main locking pawl 106 extends across the space between the side frame members, is pivoted in pie-shaped slots, and is normally held by a spring 108 in a position clear of the main ratchet wheels 104. A link 110 couples the pawl 106 to a locking mechanism which responds both to rapid acceleration of the belt B in the unwinding direction and, through the inertia-responsive actuating device 100, inertia of the vehicle to lock the reel against rotation in the belt unwinding direction.

The locking mechanism comprises a cup-like actuating wheel 112 having a slot 114 in its end wall which receives a pin 116 on the link 110. Ordinarily, the actuating wheel 112 remains stationary in a release position maintained by the link when the pawl 106 is in the unlocked position as shown in FIG. 3. Internal ratchet teeth 118 on a peripheral flange of the wheel face against the direction of rotation of the reel in the unwinding direction and are engageable by a lock-actuating pawl 120 which is mounted by a pivot pin 122 on the internal face (toward the frame) of an inertia disc 124. The pawl 120 is ordinarily held in a radially inward position away from the ratchet teeth 118, as shown in FIG. 3, by a tension spring 126 coupled between its free end and a second pin 128 on the inertia disc 124. In that position the actuating pawl 120 resides in a notch in a cam wheel 130 that is affixed to the belt reel shaft for rotation with the shaft and which is located immediately inwardly of the inertia disc 124. A lock-actuating ratchet disc 132 is rotatably carried by a collar 134 fitted on the end portion of the shaft outwardly of the inertia disc, and a friction or clutch spring (not shown) is received between the inertia disc 124 and the ratchet disc 132, the clutch spring, ratchet disc 132, and collar 134 being retained in place on the shaft against axially outward movement by a D-ring 136. The clutch spring normally couples the ratchet disc 132 to the inertia disc 124 but allows them to rotate relative to each other when the force generated by the clutch spring is exceeded.

Under normal conditions (the absence of a high acceleration of the belt, such as above about 0.7g, in the unwinding direction or response of the inertia device 100 to acceleration) the cam wheel 130 on the belt shaft works against the latch-actuating pawl 120 and imparts rotation to a sub-assembly of the mechanism consisting of the inertia disc 124, the clutch spring and the ratchet disc 132, the spring 126 holding the lock-actuating pawl 120 in the inward position shown in FIG. 3 within the notch in the cam wheel 130. If the belt B is accelerated rapidly in the unwinding direction, such as occurs when the occupant to which the belt is fitted is thrown abruptly forward in a sudden stop or collision, the belt reel and the cam wheel 130 are accelerated rotationally, and if the acceleration of the cam wheel exceeds the design level, the inertia of the aforementioned subassembly (the inertia disc 124, clutch spring and ratchet disc 132) causes the force of the spring 126 to be overcome and the rotation of the inertia assembly to lag that of the reel and the cam wheel 130. When this happens, the cam wheel pushes the actuating pawl 120 outwardly and engages it with a ratchet tooth on the actuating wheel 112 (see FIG. 4). A small amount of additional rotation of the belt reel and cam wheel in the unwinding direction rotates the wheel counter-clockwise (relative to FIGS. 3 and 4), pivots the link 110 via the pin 116, and moves the main locking pawl 106 into engagement with one of the ratchet teeth on each of the main ratchet discs 104 on the belt reel, thus stopping the reel from being rotated further in the unwinding direction, preventing the belt from being pulled out and stopping the occupant from being thrown forward.

When the force on the belt tending to unwind it from the reel ceases, the rewinding spring of the belt reel rotates the reel in the winding direction. After a few degrees rotation of the reel, the cam wheel 130 releases the actuating pawl 120 from locking engagement with the actuating wheel ratchet 118; the main pawl is disengaged from the main locking ratchet discs; and the pawl spring 108 restores the pawl and the actuating wheel to the positions shown in FIG. 3.

The retractor shown in FIGS. 3 and 4 also responds to vehicle acceleration by operation of the inertia-responsive actuating device 100 in the manner described above. When the locking tip 40 of the lever 26 engages a tooth on the inertia-locking ratchet disc 132, the inertia sub-assembly stops rotating, and after a small amount of additional rotation on the belt reel in the unwinding direction, the cam wheel pushes the actuating pawl 120 out into engagement with the actuating wheel teeth. The actuating wheel is rotated and moves the main pawl 106 into locking engagement with the main locking ratchet wheels 104 on the belt reel, as shown in FIG. 4.

It is apparent from the example of its use shown in FIGS. 3 and 4 and described above that the inertia-responsive actuating device, according to the present invention, offers the advantages of simple construction, ease of assembly, small size and weight and highly effective operation which is substantially free of friction and other inefficiencies that might reduce reliability and hamper the attainment of high sensitivity. It will also be readily apparent to those skilled in the art that the device can be used in a variety of emergency-locking retractors, especially in view of the fact that it is self-contained and of small size which makes it easy to fit into the overall retractor design. It can, for example, be readily adapted for direct engagement of a main locking pawl of the type down in FIGS. 3 and 4 by coupling the lever 26 to the main locking pawl 106 for direct engagement of the main pawl with the main ratchet discs 104.

The above-described embodiment of the invention is merely exemplary, and many variations and modifications can be made by those skilled in the art without departing from the spirit and scope of the invention. All such variations and modifications are intended to be included within the scope of the invention as defined in the appended claims.

I claim:

1. An inertia-responsive actuating device for an emergency locking vehicle seat belt retractor comprising a spherical mass, a support for the mass having an annular seat in which the mass nests in the absence of a predetermined acceleration of the seat, the seat being substantially below the center of gravity of the mass so that upon acceleration of the seat the mass rolls upwardly and laterally out of the seat; and a lever arm pivoted about a substantially horizontal axis located adjacent the seat, the lever arm having a detecting portion located above the seat and below the center of the mass and engageable by the mass when the mass rolls out of the seat such that said portion is thereupon pushed down by the mass and having an actuating portion adapted to actuate a locking mechanism of the retractor.

2. An inertia-responsive actuating device according to claim 1 wherein the detecting portion of the lever arm includes an edge which defines a hole and surrounds a lower portion of the mass above and proximate to the seat and substantially below the center of gravity of the mass.

3. An inertia-responsive actuating device according to claim 1 and further comprising a generally horizontal wall above the mass and spaced apart from the seat a distance substantially equal to the diameter of the mass so that vertical motion of the mass is substantially limited to that required to allow the mass to roll up out of the seat and whereby pushing down of the lever arm thereupon is ensured.

4. An inertia-responsive actuating device according to claim 1 wherein the seat for the mass has a circular edge, and further comprising perimeter wall means laterally surrounding the mass and limiting lateral motion of the mass to a distance in any direction such that the center of gravity of the mass always lies within an imaginary substantially vertical circular cylindrical surface which includes the circular edge, whereby the mass returns to the seat due to the gravity force thereon in the absence of any inertial forces acting thereon.

5. An inertia-responsive actuating device according to claim 1 wherein the lever arm is an integral part of a pawl which includes a tip that is adapted to engage a ratchet when the mass pushes the lever arm down.

* * * * *